(12) United States Patent
Heidemann et al.

(10) Patent No.: US 9,651,849 B2
(45) Date of Patent: May 16, 2017

(54) LOW OUTGASSING RESONATOR

(71) Applicant: TOPTICA Photonics AG, Grafelfing (DE)

(72) Inventors: Rainer Heidemann, Munich (DE); Matthias Scholz, Munich (DE)

(73) Assignee: Toptica Photonics AG, Grafelfing (DE)

( * ) Notice: Subject to any disclaimer, the term of this patent is extended or adjusted under 35 U.S.C. 154(b) by 12 days.

(21) Appl. No.: 14/807,309

(22) Filed: Jul. 23, 2015

(65) Prior Publication Data

US 2015/0331299 A1 Nov. 19, 2015

Related U.S. Application Data

(63) Continuation-in-part of application No. 13/804,108, filed on Mar. 14, 2013, now Pat. No. 9,110,290.

(30) Foreign Application Priority Data

Mar. 16, 2012 (DE) .......................... 10 2012 005 154

(51) Int. Cl.
| | |
|---|---|
| *G02B 23/16* | (2006.01) |
| *G02F 1/35* | (2006.01) |
| *F16J 15/08* | (2006.01) |
| *G02B 27/00* | (2006.01) |

(52) U.S. Cl.
CPC ........ G02F 1/3501 (2013.01); F16J 15/0806 (2013.01); G02B 23/16 (2013.01); G02B 27/0006 (2013.01); G02F 1/353 (2013.01); G02F 2001/3503 (2013.01); G02F 2001/3505 (2013.01)

(58) Field of Classification Search
CPC ... G02B 27/0006; G02F 1/353; G02F 1/3501; G02F 2001/3505; G02F 2001/3503; F16J 15/0806
USPC ........ 372/55, 57, 98–103; 359/513–514, 244
See application file for complete search history.

(56) References Cited

U.S. PATENT DOCUMENTS

| | | | |
|---|---|---|---|
| 2005/0248744 A1* | 11/2005 | Shibazaki | ........... G03F 7/70716 355/72 |
| 2007/0024011 A1* | 2/2007 | Michaud | ................ F16J 15/062 277/628 |

* cited by examiner

*Primary Examiner* — James Phan
(74) *Attorney, Agent, or Firm* — Berliner & Associates (57) ABSTRACT

An optical resonator is provided made of low-outgassing materials, including at least one chamber, a non-linear crystal arranged in the chamber, and an array of mirrors arranged in the chamber and including a plurality of mirrors for deflecting a light beam. To specify such a resonator which is low-outgassing and which ensures fine adjustment of the optical elements at the same time, the present invention proposes that the non-linear crystal and at least one mirror of the array of mirrors is arranged on one movable carrier each, wherein the said carrier is fabricated from a low-outgassing material and seals the chamber. Furthermore, a sealing system is provided including a housing, an optical element and a sealing element of indium or indium alloy, which is arranged between the housing and the optical element, wherein the optical element has a lateral surface and the sealing element is arranged on the lateral surface.

18 Claims, 9 Drawing Sheets

LOW OUTGASSING RESONATOR

CROSS REFERENCE TO RELATED APPLICATIONS

This application is a continuation-in-part of application Ser. No. 13/804,108, filed on Mar. 14, 2013, which claims priority to German application No. 102012005154.9, filed on Mar. 16, 2012, all of which are incorporated by reference herein.

BACKGROUND

Field of the Invention

The invention relates to an optical resonator made of low-outgassing materials, comprised of at least one chamber, a non-linear crystal arranged in the chamber, and an array of mirrors arranged in the chamber and comprised of a plurality of mirrors for deflecting a light beam.

Related Art

Optical resonators of this type, for example, are utilized for frequency conversion of a light beam, more particularly a laser beam. Requirements exacted from the setup of an optical resonator are high. In case of generating ultraviolet laser radiation, in particular, high purity in the surrounding of the non-linear crystal is required. What is striven for is an environment composed of low-outgassing materials, whereby the choice of materials eligible for the setup of a resonator is noticeably confined.

The term "outgassing" defines a process in which materials dissipate impurities even down to extremely low partial pressures ($<10^{-10}$ Torr). This liberation of gases (outgassing) is problematic for an optical resonator, because impurities settle down on optical elements—e.g. on mirrors and on the non-linear crystal—and thus may adversely affect the functional mode, more particularly the quality of the optical resonator. Eligible as low-outgassing materials, for example, are metals and glasses, but even PTFE and piezoelectric ceramics and crystals.

To date, excimer and solid state laser systems are applied in the ultraviolet radiation range. In operation, they usually emit at a fixed wavelength. In this case, the resonators can be adjusted ex works, thus not calling for any (post) adjustment of the optical elements if wavelength varies.

The situation is different with diode lasers, whose wavelength can be varied over a greater spectral range. In this case, the optical elements and the non-linear crystal must be movable in order to be able to consider a shift in wavelength. The non-linear crystal, in particular, must be rotatable about the correct phase alignment angle in case of a wavelength shift and be adjustable, unless other phase alignment mechanisms as for example via temperature are insufficient.

On account of the limited choice of low-outgassing materials on the one hand and on the other hand because of the requirement demanding configuring the resonator in such a manner that a fine adjustment of the optical elements with regard to wavelength alignment is feasible, in particular when using light within the ultraviolet range, those optical resonators currently available do not fulfill all requirements exacted and hence they should be regarded as a compromise solution in which either the selected materials are low-outgassing materials or in which a fine adjustment of the optical elements is feasible.

SUMMARY

The invention further relates to a sealing system and to a hermetically sealed laser system.

It is known in the art to use indium for sealing in UHV (ultra-high vacuum) systems or hermetically sealed systems. Indium is particularly suitable as sealing element, because it is less sensitive to mechanical shock and vibration than other metal-based sealing materials.

From US 2007/0024011 A1 a sealing system for a laser device is known, for example, in which an indium O-ring is arranged between an aluminum profile and an aluminum flange in order to obtain a hermetically sealed cover.

However, hermetically sealed laser devices not only require metal-to-metal seals but also means for sealing of optical components such as mirrors and windows. In order to achieve long-term stability of such devices contaminated air constituents have to be prevented from entering in the volume concluded. From Saeki, H.; Ikeda, J.; Ishimaru, H.: "Optical window sealed with indium for ultra high vacuum", in: Vacuum 39 (1989), No. 6, p. 563/564, for example, such a seal is known. An optical window is sealed with indium and is used in the field of UHV. The window described comprises a disk made of quartz glass and an aluminum sleeve. The indium seal is disposed between the disc and the sleeve and rests against the surface of the disc. A disadvantage of this sealing system is that the clear aperture of the optical system is reduced and that also an undesirable film of indium may be formed on the optical element, due to the flow properties of indium, whereby the optical properties may be changed.

Against this background, it is the object of the present invention to provide an optical resonator of the aforementioned type which on the one hand is a low-outgassing material and which at the same time allows for a fine adjustment of the optical elements without entailing any disproportionate increase in manufacturing expenditure and cost of material.

It is a further object to provide a sealing system that has a high mechanical long-term stability and also enables a maximum free aperture of the optical element. A long service life should be ensured.

Still further, it is an object of the present invention to provide a hermetically sealed laser system in which the leak rate is minimum, whereby a high long-term stability can be ensured.

This task is solved by arranging the non-linear crystal and at least one mirror of the mirror array each on a movable carrier which is fabricated from low-outgassing material and which seals the chamber so as to prevent ingress of any impurities into the resonator chamber.

This enables a fine adjustment of the optical elements of the resonator, whilst the chamber sealing is ensured at the same time. Moreover, the choice of the carrier material takes the effect of protecting the chamber and the components accommodated therein from contamination due to carrier material outgassing.

Eligible as nonlinear crystals are anti-reflex coated crystals which are cut for normal incidence of a light beam and which are particularly suitable for generating light below a wavelength of 400 nm.

To counteract initial damage at the surface of the non-linear crystal which is evoked by the absorbing boundary layers between the non-linear crystal and the coating or by the coating itself, it may preferably be cut near the Brewster angle and in that case it will not need any anti-reflect coating.

In a preferred embodiment of the optical resonator, it is provided for that the carriers are movable from the outside, with the resonator being closed. With this preferred embodiment, an adjustment of the mirrors and of the non-linear crystal is feasible, for example, during the operation of the optical resonator. This reduces the risk of contaminating or damaging the mirrors and non-linear crystal or prevents contamination in general from penetrating into the interior when opening the optical resonator for the purpose of adjusting the mirrors and the non-linear crystal. Moreover, the possibility of being able to make an adjustment to the mirrors and to the non-linear crystal from the outside simplifies operability of the inventive optical resonator because one cannot intervene into the itinerary of light.

Furthermore, it is preferable to have carriers that are movable by means of at least one fine-thread screw. In this manner, the carriers are easy and precise to adjust with the optical elements connected therewith.

In another preferred embodiment, the fine-thread screw is spring-preloaded, wherein the spring load is preferably directed opposite to the screw-in direction of the fine-thread screw, thus counteracting a fabrication-prompted play between the fine-thread screw and the threaded bore.

It is moreover preferable that at least one of the carriers seals the chamber via a hermetically air-tight sealed solid state hinge. This setup represents a cost-efficient possibility which on the one hand ensures excellent sealing of the chamber of the optical resonator and on the other hand it ensures very good movability in combination with high stability.

It is especially advantageous for the carriers to be fabricated from metal. It has become evident that carriers made from nickel silver or aluminum feature very good mechanical properties and are suitable for the setup of movable carriers. Moreover, nickel silver and aluminum are low-outgassing materials.

The carriers are preferably fabricated by means of wire erosion. Thereby it is ensured that the carrier material properties are not adversely affected during the fabrication process and in particular that impurities which might outgas later-on are prevented from penetrating into the carrier material during the fabrication process. Moreover, wire erosion allows for fabricating carriers with very little fabrication tolerances. Openings in the carriers developing during wire erosion are subsequently closed by soldering or welding in order to hermetically seal the carrier.

Furthermore, an indium wire is preferably arranged between the carrier and the casing as well as between the carrier and the mirror in order to seal the chamber. Indium wires are distinguished by their good flow properties and thus they are best suitable to serve as sealing material, in particular because pure indium wires are low-outgassing materials and thus they can unobjectionably be utilized in the inventive optical resonator.

Another preferred embodiment of the present invention provides for that the non-linear crystal is rotatable in the phase alignment plane. This is furthermore realized in that the non-linear crystal is mounted on an axis which allows for a rotation in the phase alignment plane—stretched-on by the beam propagation direction of the circulating fundamental wave and the optical axis of the non-linear crystal.

The non-linear crystal is furthermore preferably coupled thermally with the pertaining carrier. A thermic coupling of the non-linear crystal to the carrier takes the effect that the non-linear crystal can be held at the temperature necessary for the phase alignment. The carrier is furthermore preferably coupled thermally with a Peltier element, a heat exchanger and/or a temperature sensor (e.g. a thermistor). Owing to thermic coupling, these elements, however, can be located outside the optical resonator and thus they themselves need not be low-outgassing. With the preferred embodiment of the present invention, in which the non-linear crystal is mounted on a rotatable axle, the axle of the carrier is also thermally coupled with a Peltier element, a heat exchanger and/or a temperature sensor (e.g. a thermistor), though thermally uncoupled from the carrier itself.

In case of damage to the non-linear crystal caused by ultraviolet light, the crystal should be able to be shifted vertically to the beam propagation direction. To this effect, the fine-thread screws of the crystal carrier are mounted on a rack that generates a mere translation of the crystal carrier vertically to the beam direction through the non-linear crystal.

In order to permanently ensure purity in the surrounding of the non-linear crystal, the present invention furthermore provides for that a getter material is arranged in the chamber. Getter materials take the effect that possibly existing impurities and moisture can be captured and intercepted and do not settle down on the surfaces of the mirrors and of the non-linear crystal.

Moreover, a sealing system is disclosed which comprises:
a housing,
an optical element and
a sealing element of indium or an indium alloy, which is arranged between the housing and the optical element, wherein the optical element has a lateral surface and the sealing element is arranged on the lateral surface.

The sealing system of the invention has the advantage over the prior art that the free aperture of the optical element may be as large as possible, and a long-term mechanical stability of the system and in particular of the optical element is ensured.

Measurements of the sealing system according to the invention have shown that the leak rate compared with the known systems is much better. By the sealing system according to the invention, an improvement of the leak rate by more than three orders of magnitude was achieved. The sealing system according to the invention provides the same quality as the known metal-to-metal seals.

With the sealing element being no longer arranged on the front surface of the optical element, an indium film, which can be caused by the flow behavior of the indium is avoided on the surface. By the indium element being arranged on the lateral surface according to the invention, the aperture of the optical element may be as large as possible.

Advantageously, the lateral surface of the optical element is polished. Thereby, the leakage rate can be further improved. The polished surfaces can for example be achieved in that they are laser-polished. By melting a thin surface layer with laser radiation is carried out a smoothing of the surface due to the interfacial tension. It is also possible to obtain the circumferential surface polished by conventional grinding and polishing techniques.

The sealing element may be disposed in a groove which is preferably arranged between the optical element and the housing. Advantageously, the optical element and the housing are formed such that a gap is located partially in an assembled state of the sealing system between them. The gap is particularly preferred completely filled by the sealing element. Such a structure leads to a high quality seal, which has a very low leak rate.

As the indium can be deformed well, it fits the area to be sealed perfectly. Acts a force, for example via the housing or the optical element on the sealing element, the seal member is deformed. Thus, it is possible that a seal element e.g. formed as an O-ring has a C-shaped cross-section in a built-in state.

Due to the deformability of indium it is also possible that not a special sealing element must be constructed for each sealed geometry. It merely has to be ensured that the volume of the sealing member is large enough to fill the affected area.

As the sealing element, for example, indium wire can be used, which may have different diameters depending on the application.

Advantageously, the housing has at least a first member and a second member. The elements may be formed as hollow cylinders. Preferably, the second element is at least partially disposed in the first element. The second element preferably has at its one end a tongue which is preferably formed circumferentially on the element. The first element has at least one recess. Preferably, the recess is formed as a circular ring. The recess and the optical element can be arranged such that the outer surface of the optical element and the recess form a groove. The groove has a cross section which corresponds to the cross section of the tongue. Preferably, the cross section of the groove is larger than that of the tongue, so that a gap remains. The gap may be U-shaped or C-shaped. Advantageously, the sealing element fills the gap (after plastic deformation) completely.

The first member may also have a recess, in which the optical element is arranged, the optical element being preferably cylindrical. The optical element may, however, depending on the application, have other shapes, such as rectangular or the like. Preferably, the optical element is a mirror or an optical window.

Preferably, the sealing system comprises a spring element which presses the optical element against the housing. More preferably, the spring element is a wave spring. Either individual wave springs or spring packages consisting of several springs can be layered in alternate directions. By using a spring element a stable defined position of the optical element is ensured. By the spring element any unevenness between the housing and the optical element can be compensated for, so that the optical element is properly positioned or aligned, and thus interferences with the optical measurement applications are minimized. The spring element may be preferably located in a recess of the housing. When assembled, the spring element is advantageously provided with a first base on a base of the optical element.

The sealing system according to the invention is particularly suitable for use in high vacuum or in an ultrahigh vacuum. The sealing system may, however, be found more generally in a hermetically sealed laser system application.

Furthermore, the invention relates to a hermetically sealed laser system for the vacuum preferable in the UHV range using a sealing system according to the invention. According to the invention "hermetically" understood to the effect that a leakage rate of less than $10^{-6}$ mbar×l/s.

The hermetically sealed system of the invention prevents contamination by hydrocarbons and other contaminants in, for example, UV transmitting-reflecting surfaces.

Preferably, the laser system most preferably comprises an optical resonator.

A laser system with a corresponding sealing system preferably has a leak rate of <$10^{-9}$ mbar×l/s.

The sealing system according to the invention provides thus in terms of its tightness the same quality as those known from the prior art metal-to-metal seals. The sealing system according to the invention is, therefore, no longer the critical vulnerability of such laser systems. The long-term power stability is thus ensured in the laser system of the invention.

BRIEF DESCRIPTION OF THE DRAWINGS

The invention is elucidated in the following by way of a practical example, where.

DETAILED DESCRIPTION

Figure 1:
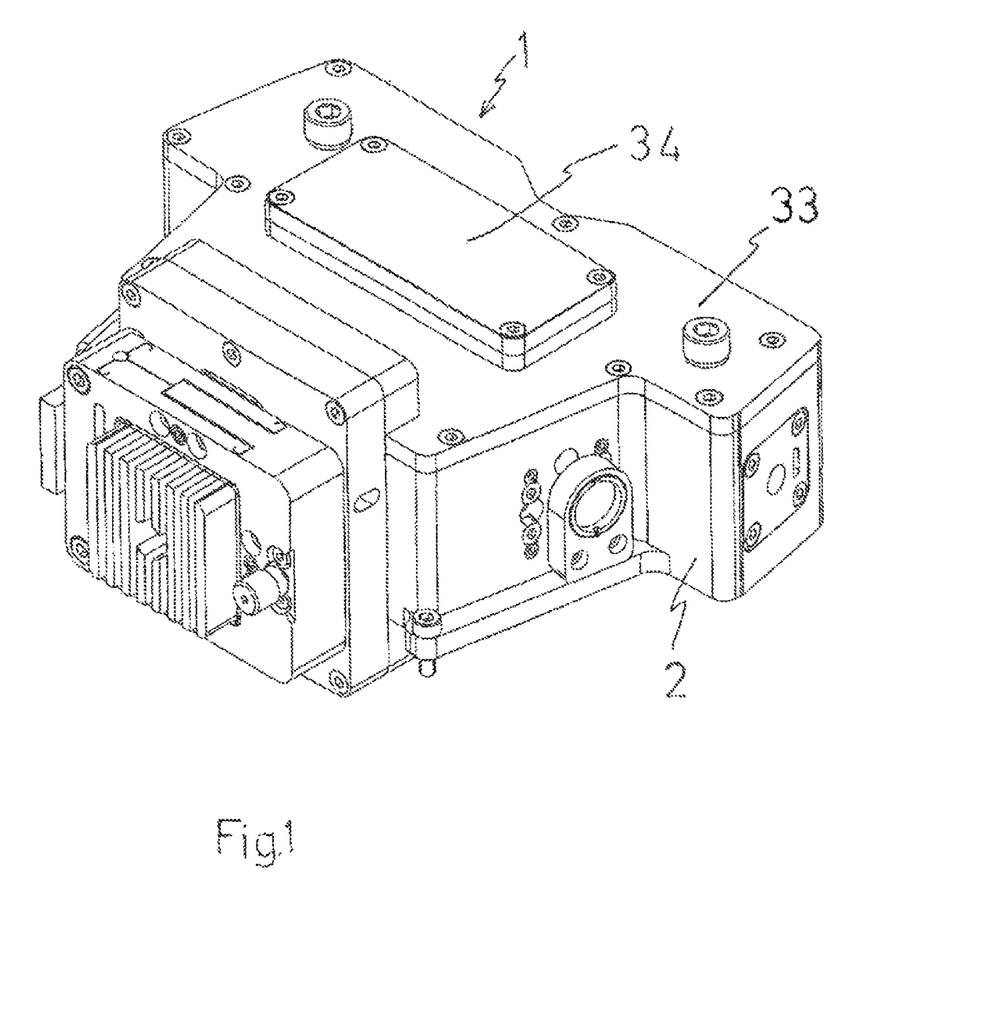
FIG. 1: is a perspective view of an inventive resonator.
Figure 2:
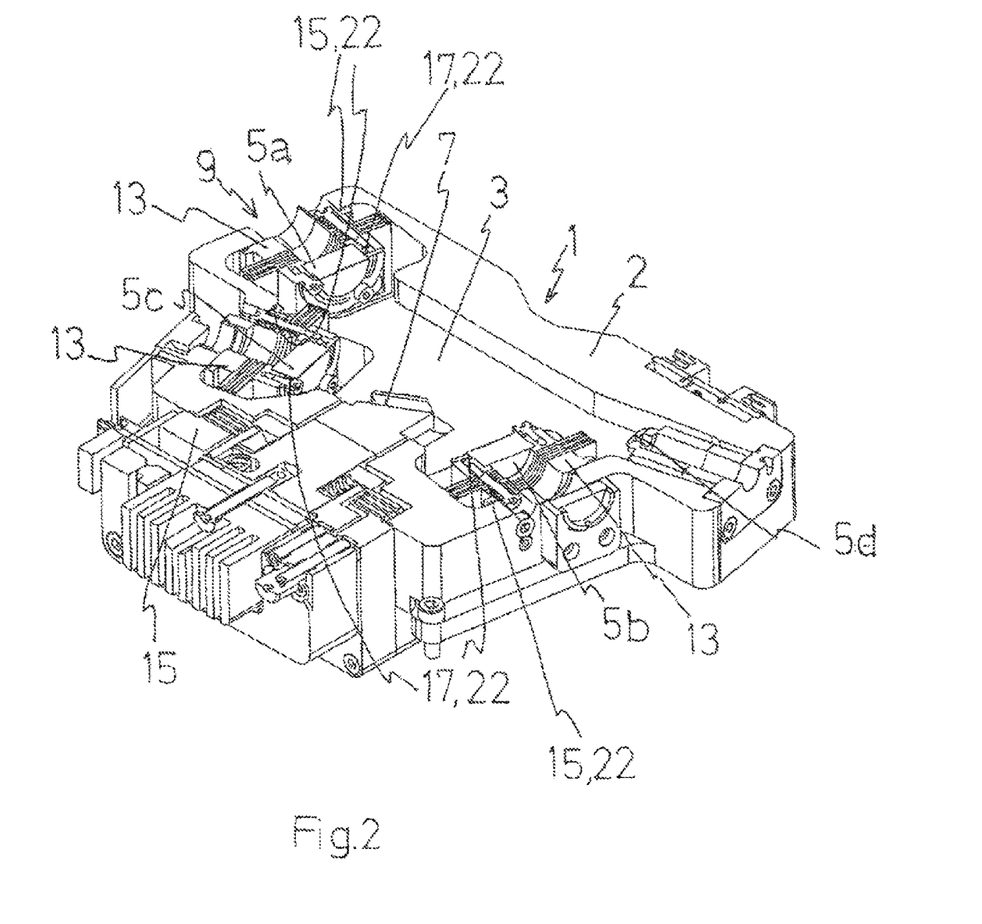
FIG. 2: is a perspective horizontal sectional view of the resonator of FIG. 1.
Figure 3:
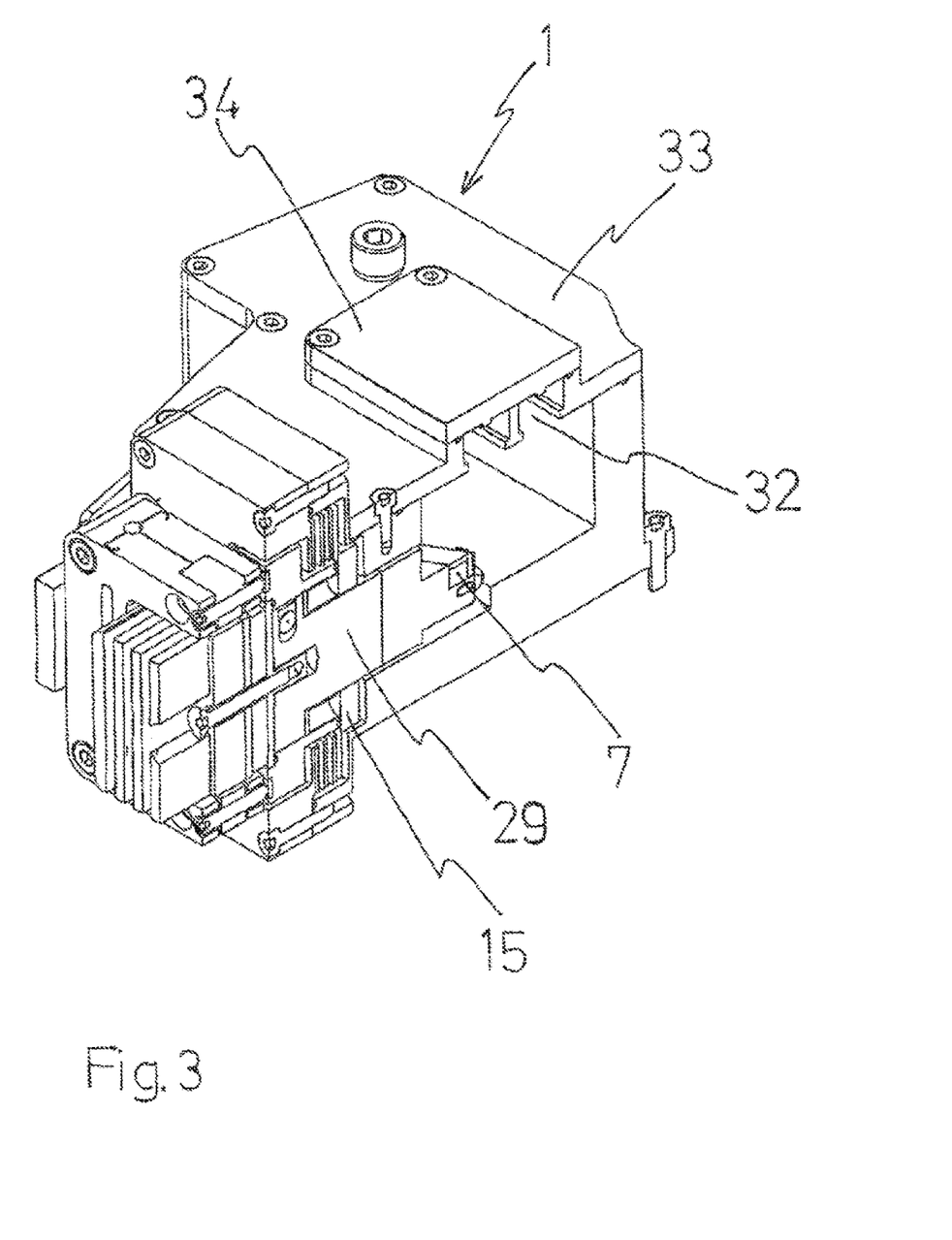
FIG. 3: is a perspective vertical sectional view of the resonator of FIG. 1.

FIGS. 1, 2, and 3 show various views of an inventive optical resonator in a bow-tie arrangement. The optical resonator 1 is comprised of a resonator base body 2, which defines a resonator chamber 3 in which mirrors 5a, 5b, 5c, and 5d are arranged. Located in between of mirrors 5b and 5c is a non-linear crystal 7. The mirrors 5b and 5c are usually configured in an optical resonator in a bow-tie arrangement as curved mirrors, whereas mirrors 5a and 5d are usually planar.

The optical resonator 1 moreover comprises a light entrance opening 9 which serves for coupling-in a laser beam into the resonator chamber 3. The light entrance opening 9 furthermore comprises a usually planar mirror 5a which is configured as coupling-in mirror.

The mirrors 5a, 5b, and 5c each are arranged on a carrier 13 configured as a metal bellows, said carrier being firmly and tightly connected with the casing of the optical resonator. The non-linear crystal 7 is also arranged on a carrier 15, which is configured as a metal bellows and which is connected with the casing of the optical resonator. The carrier 13 is shown separately in FIGS. 4 and 5, whereas the carrier 15 is shown separately in FIGS. 6 and 7.

Owing to the setup of the carriers 13 and 15 as hermetically sealed solid state hinges, a sealing of the resonator chamber 3 is thus brought about, whilst also ensuring movability of the optical elements connected therewith—in this case it is mirror 5a, 5b, and 5c as well as the non-linear crystal 7.

Figure 4:
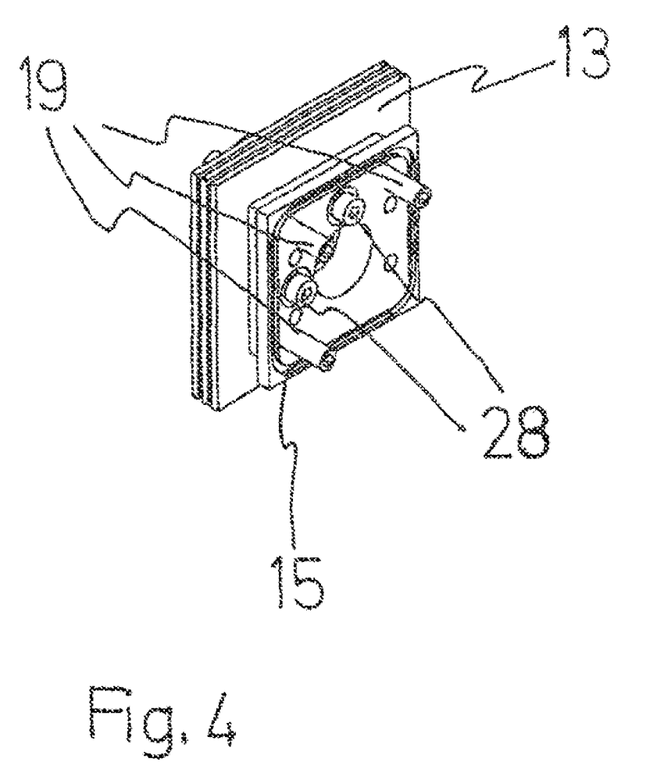
FIG. 4: is a perspective view of a mirror retainer.
Figure 5:
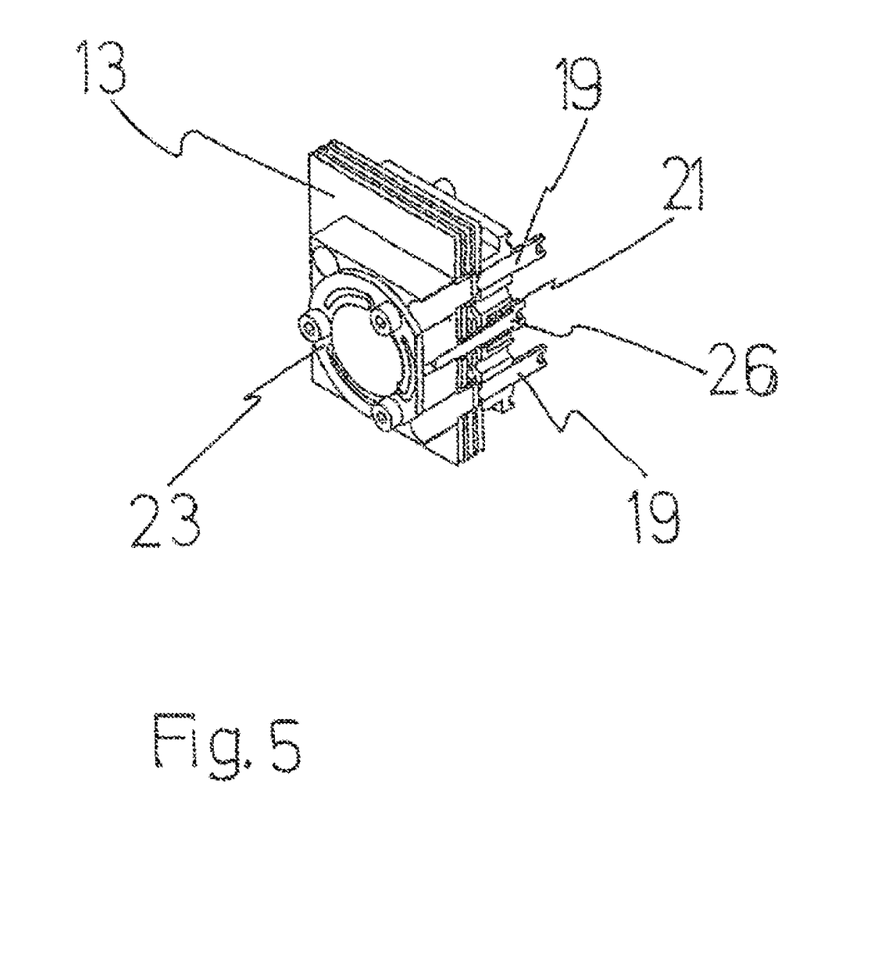
FIG. 5: is a perspective vertical sectional view of the mirror retainer of FIG. 4.

To seal the resonator chamber 3 between the carrier 13 and the resonator base body 2, grooves 15 are embedded onto the carrier 13, said grooves accommodating the sealing 22 made of indium wire. Furthermore, to provide for a sealing between mirrors 5a, 5b, and 5c as well as the carrier 13, a plate 23 each is pressed onto the indium wire 22 embedded in an annular groove 17. All screwed-on elements, e.g. lids and piezo carriers, are thus preferably sealed with a sealing made of indium.

To adjust the mirrors 5a, 5b, and 5c, three fine-thread screws 19 are provided for each carrier 13. The fine-thread screws 19 are so arranged that they form a three-point suspension which allows for shifting the mirror 5a, 5b, or 5c connected therewith along its optical axis as well as a rotation of the same about two axes being vertical towards the optical axis. For further adjustment, clamping screws 28 are provided for, there being springs 21 arranged within the carrier 13, the spring load of which works against the screw-in direction of the fine-thread screws 19.

Figure 6:
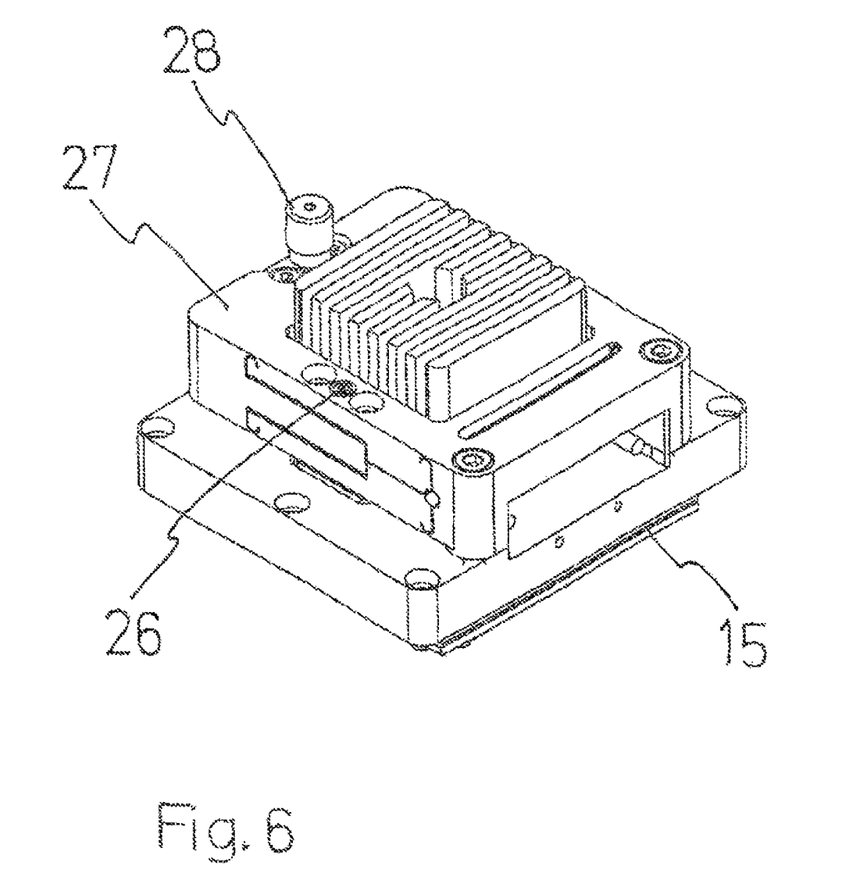
FIG. 6: is a perspective view of a crystal retainer.
Figure 7:
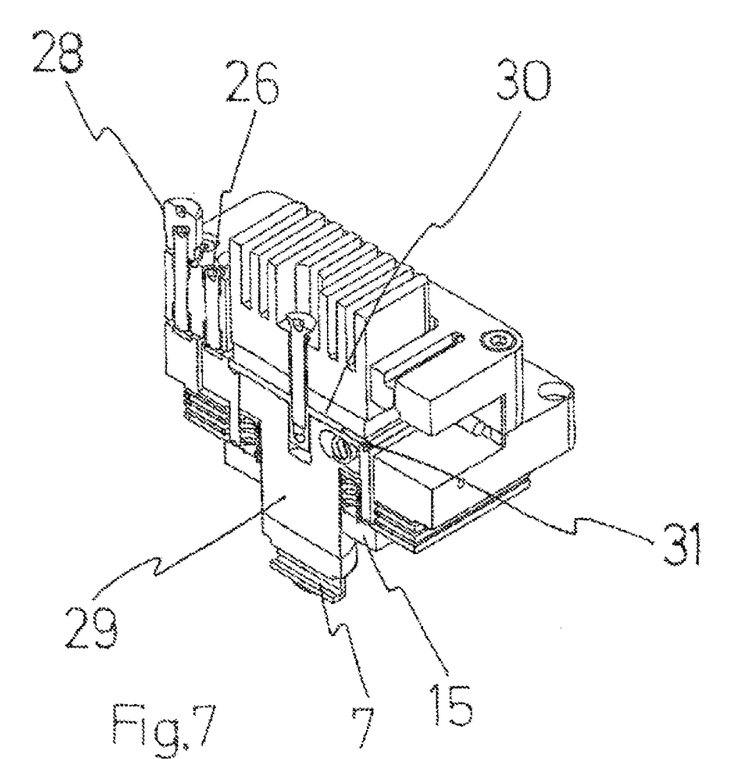
FIG. 7: is a perspective vertical sectional view of the crystal retainer of FIG. 6.

The functional mode of carrier 15 of the non-linear crystal 7 basically corresponds to that of carrier 13. Besides, the non-linear crystal 7 can be shifted vertically versus the beam propagation direction by the non-linear crystal 7 and rotated, if required. Fine-thread screws 26 of the carrier 15 are mounted on a rack 27 for adjusting the position of the non-linear crystal 7, said rack being equipped with guide levers configured as a parallelogram. This arrangement of the guide levers permits the carrier 15 to execute a mere translation without tilting by turning a translation screw 28. The non-linear crystal 7 is moreover mounted on a movable axle 29 enabling a rotation in the phase alignment plane.

Additionally, the axle 29 is thermally coupled with the non-linear crystal 7 proper so that for example the heat needed for operation can be supplied or a Peltier element 30 and/or thermistor 31 for temperature control can be arranged outside the resonator chamber 3. A getter chamber 32 for getter materials is provided for in a lid 33 of the chamber 3. This getter chamber is provided with a lid 34 of its own so as not to need opening the lid 33 of the resonator 1 when exchanging the getter material.

The functional mode of the practical example outlined hereinabove of the inventive optical resonator 1 is described in the following.

A light beam is coupled-in through the light entrance opening 9 into the chamber 3 of the optical resonator 1 and directed to the mirror 5d where it is reflected via mirror 5b to mirror 5c. The light beam is passed between mirrors 5b and 5c through the non-linear crystal 7, whereby its frequency is doubled.

For uncoupling of the frequency-doubled light beam, one of the mirrors 5d, 5b or 5c, preferably 5b, is configured as an uncoupling mirror.

The mirrors 5a, 5b and 5c and possibly the mirror 5d as well as the non-linear crystal 7 can be variably positioned for the purpose of adjustment and adaptation to a certain light wave length. By turning the fine-thread screws 19 each arranged at carrier 13, the mirrors 5a, 5b, and 5c can be moved from the outside. Moreover, the orientation of the non-linear crystal can be modified by turning the axle 29 relative to the incident light beam in order to fulfill and meet the conditions and requirements for phase alignment.

By turning the translation screw 28, the non-linear crystal 7 can be shifted vertically versus the beam propagation direction in case of an optically induced damage so that the incident light beam can hit on a non-damaged spot of the non-linear crystal 7.

Figure 8:
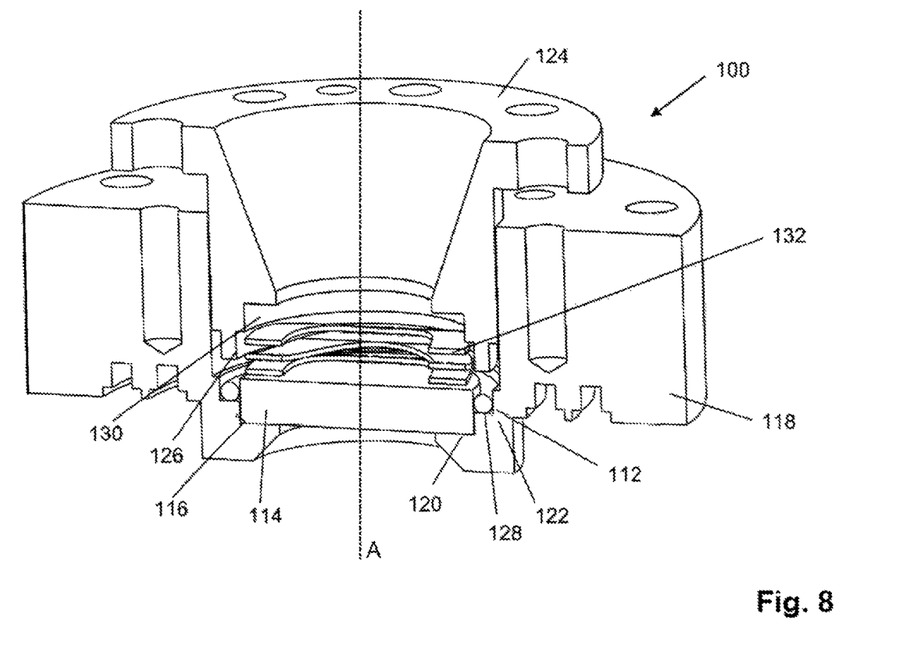
FIG. 8: perspective sectional view of a sealing system according to the invention in a not yet completely assembled condition.

In FIG. 8, a perspective sectional view of a sealing system 100 according to the invention in a not yet completely assembled condition in a preferred embodiment is shown. The sealing system 100 comprises a housing, which is composed of a first element 118 and a second element 124. The elements 118, 124 may be formed as hollow cylinders. Preferably, the second element 124 is pushed into the first member 118. The second element 124 has at one end a recess 130 and a circumferential tongue 126. The recess 130 as well as the tongue 126 are preferably configured rotationally symmetric to the axis A. In the recess 130 a spring element 132, preferably a wave spring, which is especially preferably designed as a spring stack, is disposed.

The first element 118 has a first recess 120 and a second recess 122. The recesses 120, 122 preferably extend symmetrically relative to the axis A. In the first recess 120, an optical element 114 is arranged. The optical element 114 advantageously has a polished lateral surface 116. The optical element 114 is preferably cylindrical. Depending on the application, the optical element 114 may have different expansions. Preferably, the optical element 114 is a mirror or an optical window, for example, for coupling of laser radiation in a (evacuated or filled with an inert gas) resonator.

The optical element 114 and the second recess 122 are formed such that the second recess 122 and the lateral surface 116 of the optical element 114 form a groove 128.

The groove 128 has at least such an extension that it can accommodate the tongue 126. Preferably, it is wider and/or deeper than the tongue 126, so that, in an assembled state, a gap 134 is formed between the tongue 126 and the walls of the groove 128. In the groove 128 a seal member 112 made of indium is arranged. The sealing element 112 rests against the lateral surface 116 of optical element 114. The sealing element 112 is advantageously designed as an O-ring.

Figure 9:
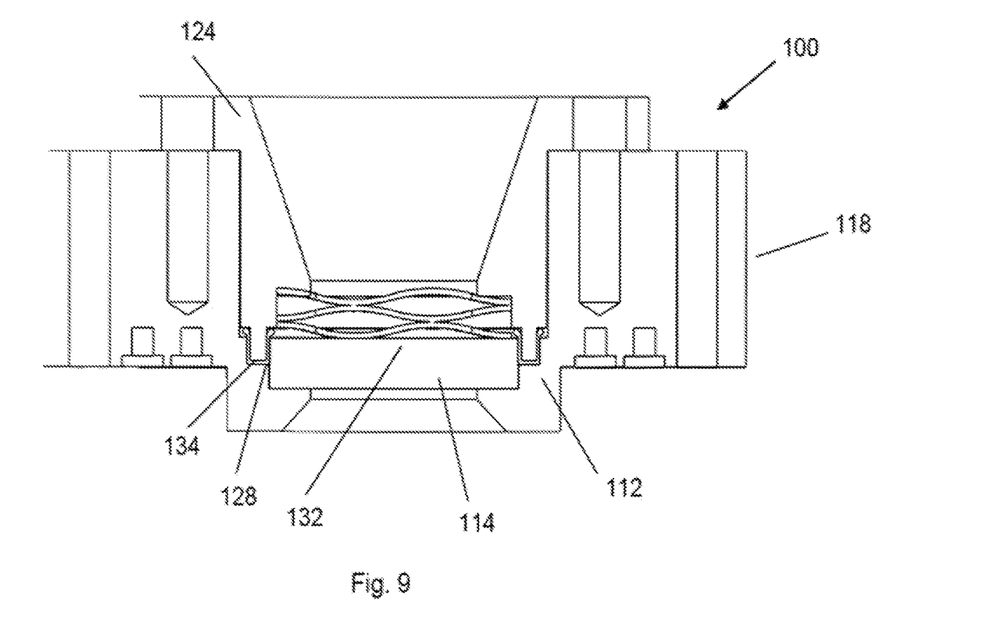
FIG. 9: detail of a schematic sectional representation of sealing system according to the invention in an assembled state.

In the assembled state, as shown in FIG. 9, the seal member 112 has no longer a circular cross section, but a U-shaped cross-section. The sealing element 112 fills the gap 134 completely. The sealing member 112 seals both between the optical element 114 and second element 124, and also between the first element and the second element 118, 124. Through the use of the spring member 132 a stable defined position of the optical element 114 is ensured. By the spring element 132 any unevenness between the housing and the optical element 114 can be compensated.

What is claimed is:

1. A sealing system (100) comprising:
    a housing (118, 124),
    an optical element (114) and
    a sealing element (112) of indium or an indium alloy, which is arranged between the housing (118, 124) and the optical element (114),
    wherein the optical element (114) has a lateral surface (116) and the sealing element (112) is arranged on the lateral surface (116),
    wherein the housing has a first element (118) and a second element (124), and
    wherein the first element (118) has a recess (122) and the second element (124) has a tongue (126) which engages in the recess.

2. Sealing system (100) according to claim 1, wherein the sealing element (112) is sealingly disposed both between the optical element (114) and the second element (124) and between the first (118) and the second element (124).

3. Sealing system (100) according to claim 1, wherein the sealing element (112) is an O-ring.

4. Sealing system (100) according to claim 1, wherein the optical element (114) is cylindrical.

5. Sealing system (100) according to claim 1, wherein the optical element (114) is a mirror or an optical window.

6. Sealing system (100) according to claim 1, wherein the sealing system (100) comprises a spring element (132) that presses the optical element (114) against the housing (118, 124).

7. Sealing system (100) according to claim 6, wherein the spring element (132) is a wave spring.

8. Hermetically sealed laser system with a sealing system (100) according to claim 1.

9. Laser system of claim 8, wherein the laser system is an optical resonator.

10. Sealing system (100) according to claim 1, wherein the lateral surface (116) of the optical element (114) is polished.

11. Sealing system (100) according to claim 1, wherein the sealing element (112) is arranged in a groove (128).

12. A sealing system (100) comprising:
a housing (118, 124),
an optical element (114) and
a sealing element (112) of indium or an indium alloy, which is arranged between the housing (118, 124) and the optical element (114),
wherein the optical element (114) has a lateral surface (116) and the sealing element (112) is arranged on the lateral surface (116), and
wherein the optical element (114) is cylindrical.

13. Hermetically sealed laser system with a sealing system (100) according to claim 12.

14. Laser system of claim 13, wherein the laser system is an optical resonator.

15. A sealing system (100) comprising:
a housing (118, 124),
an optical element (114) and
a sealing element (112) of indium or an indium alloy, which is arranged between the housing (118, 124) and the optical element (114),
wherein the optical element (114) has a lateral surface (116) and the sealing element (112) is arranged on the lateral surface (116), and
wherein the sealing system (100) comprises a spring element (132) that presses the optical element (114) against the housing (118, 124).

16. Sealing system (100) according to claim 15, wherein the spring element (132) is a wave spring.

17. Hermetically sealed laser system with a sealing system (100) according to claim 15.

18. Laser system of claim 17, wherein the laser system is an optical resonator.

* * * * *